(12) United States Patent
Harker

(10) Patent No.: US 8,904,926 B1
(45) Date of Patent: Dec. 9, 2014

(54) MOBILE HAY PRESS AND METHOD OF USING THE SAME

(76) Inventor: Joseph Harker, Pioche, NV (US)

( * ) Notice: Subject to any disclaimer, the term of this patent is extended or adjusted under 35 U.S.C. 154(b) by 484 days.

(21) Appl. No.: 13/369,230

(22) Filed: Feb. 8, 2012

(51) Int. Cl.
*A01F 15/04* (2006.01)

(52) U.S. Cl.
USPC ............. 100/35; 100/7; 100/188 R; 100/190; 100/215; 100/218; 100/232; 100/244; 100/245; 100/264

(58) Field of Classification Search
USPC ........... 100/2, 3, 7, 35, 179, 188 R, 189, 190, 100/215, 218, 240, 232, 244, 245, 264; 56/341, 432, 449
See application file for complete search history.

(56) References Cited

U.S. PATENT DOCUMENTS

| | | | |
|---|---|---|---|
| 5,001,974 A | 3/1991 | Gombos | |
| 5,701,723 A | 12/1997 | Simpson | |
| 6,339,986 B1 | 1/2002 | Van Hierden | |
| 6,579,552 B1 | 6/2003 | Myhre et al. | |
| 6,631,672 B2 | 10/2003 | Hierden | |
| 7,127,985 B2 | 10/2006 | Standlee | |
| 7,303,160 B2 * | 12/2007 | Bouldin et al. | ............ 241/101.2 |
| 7,617,653 B2 | 11/2009 | Viaud et al. | |
| 7,895,944 B2 | 3/2011 | Derstine et al. | |
| 2002/0100374 A1 | 8/2002 | Ast | |
| 2004/0043097 A1 * | 3/2004 | Bouldin et al. | ............ 425/376.1 |
| 2009/0025576 A1 * | 1/2009 | Ribas-Blanes | ................. 100/35 |

OTHER PUBLICATIONS

Hunterwood Technologies; 2008 Product Catalog—Advancing International Agriculture, www.hunterwood.com, pp. 1-15, Cochrane, Alberta, Canada.
Double Press Mfg, Inc., Hay compressors and hay handling equipment for domestic and export applications—Double Press 3-Tie and 2-Tie Press, pp. 1-2, Hemet, CA.

* cited by examiner

*Primary Examiner* — Jimmy T Nguyen
(74) *Attorney, Agent, or Firm* — Greenberg Traurig

(57) ABSTRACT

A hay press configured to generally (i) receive hay bales; (ii) cut the twine holding the hay bales together; (iii) move, by weight, a pre-established amount of hay into a compression chamber; (iv) compress the pre-established amount of hay into a package of pre-established size; and (v) eject and wrap the compressed package of hay for shipping. The hay press includes a (i) loading table and destacker; (ii) twine slicer; (iii) loading compartment; (iv) loading hydraulic press and platen; (v) infeed forks; (vi) compression chamber; (vii) scale; (viii) compression chamber door; (ix) hydraulic compression ram and platen; (x) hydraulic ejection press and platen; and (xi) ejection chute. An optional conveyor system may operate in conjunction with the hay press to transport loose hay having fallen during operation of the hay press to a loose hay loading chamber.

17 Claims, 15 Drawing Sheets

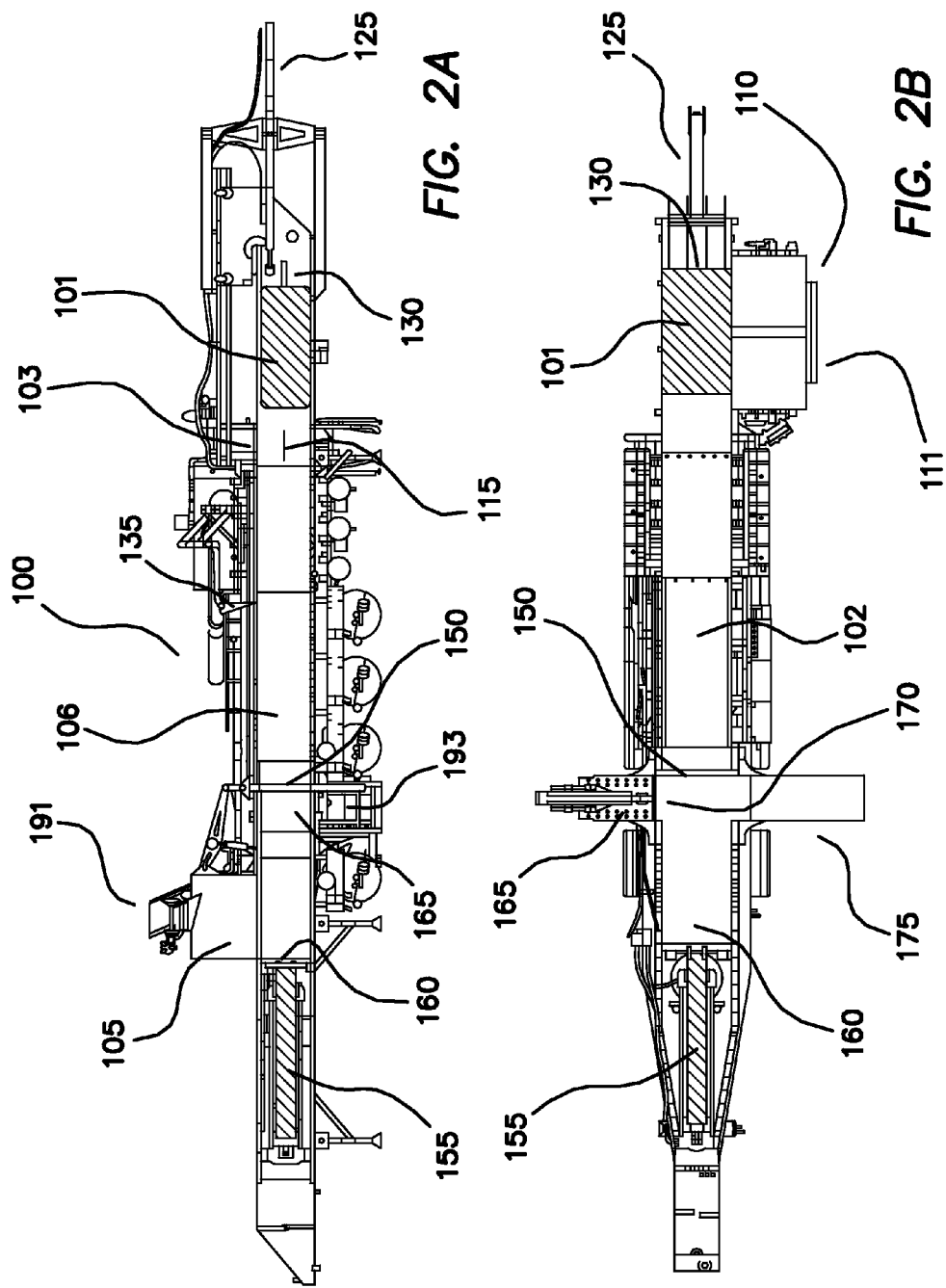

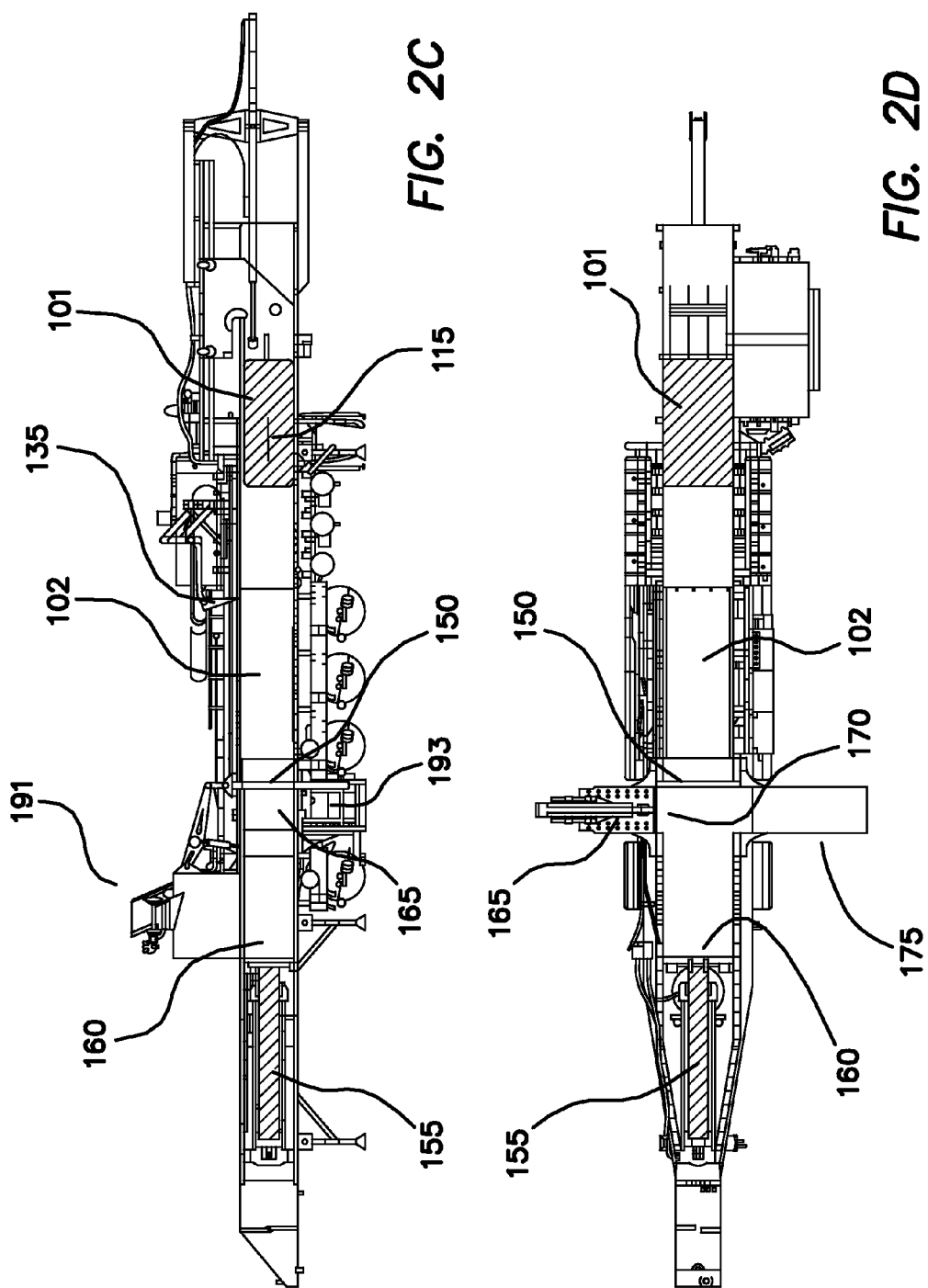

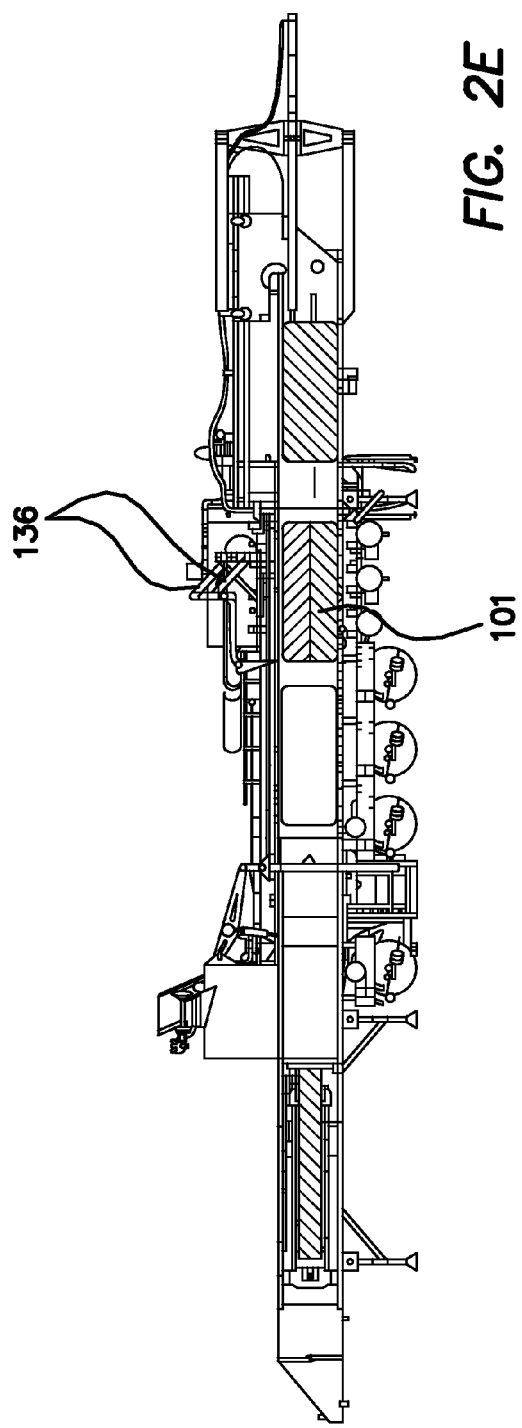
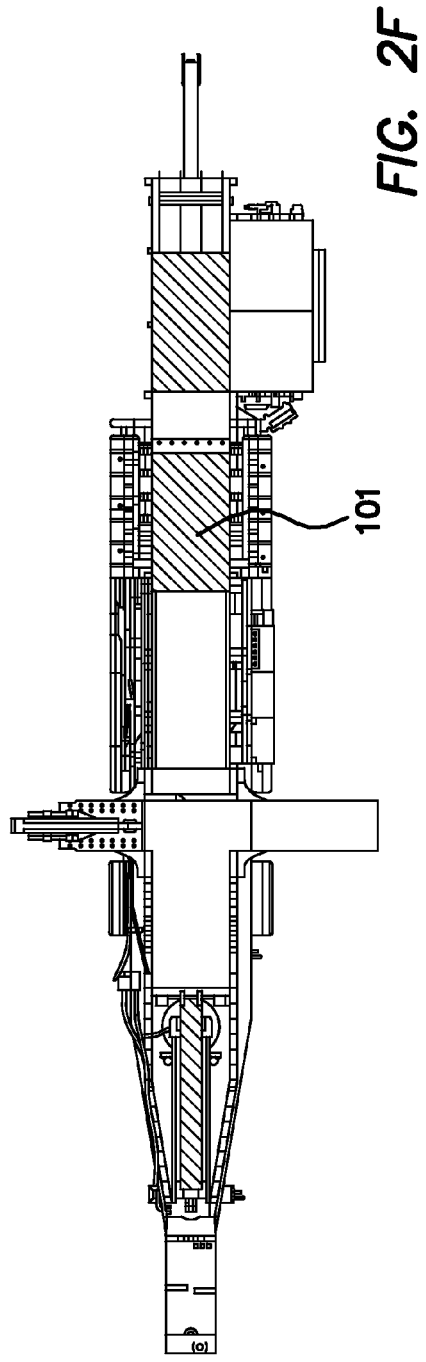
FIG. 2E
FIG. 2F

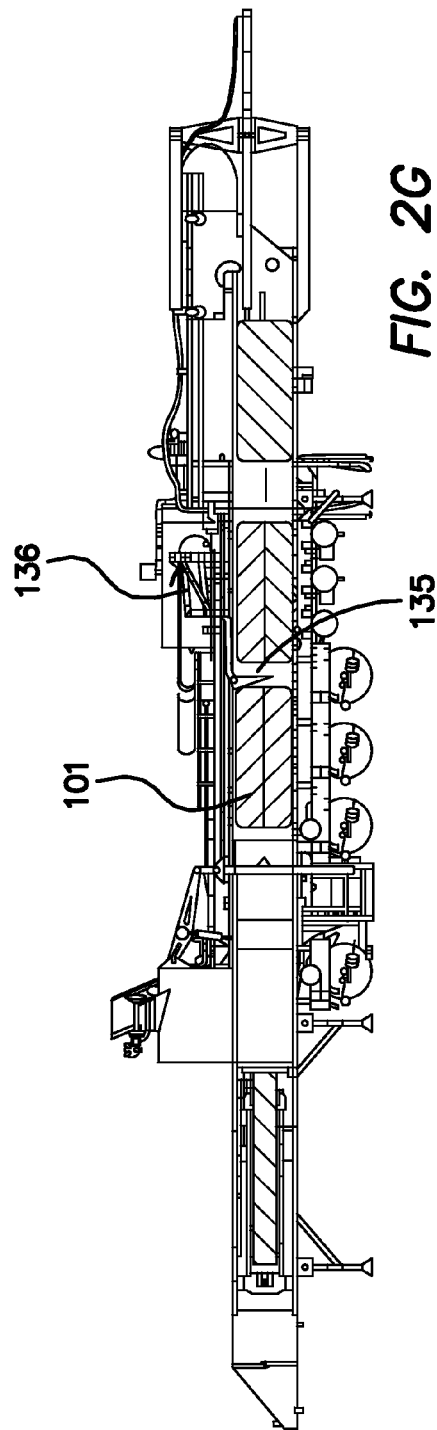
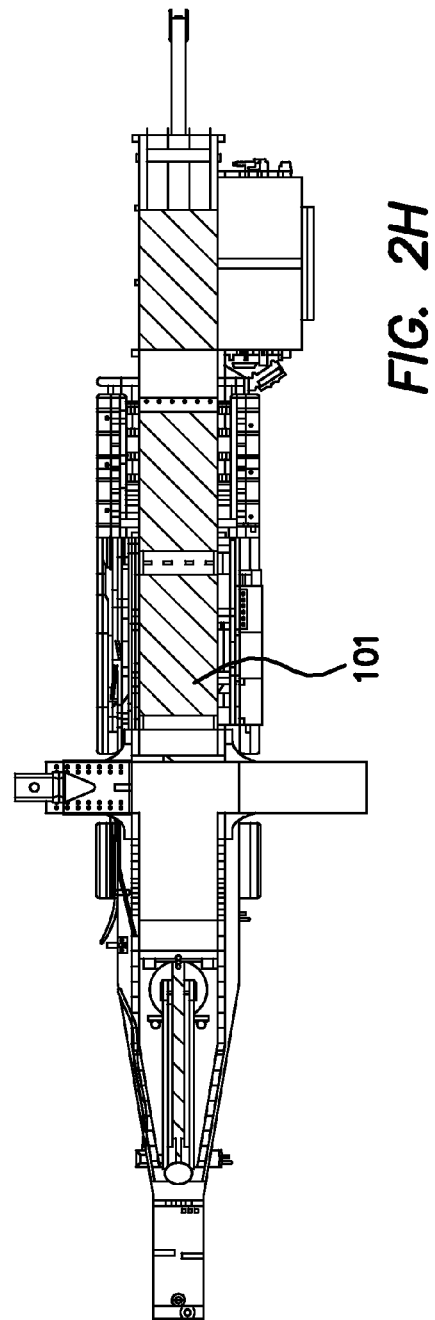

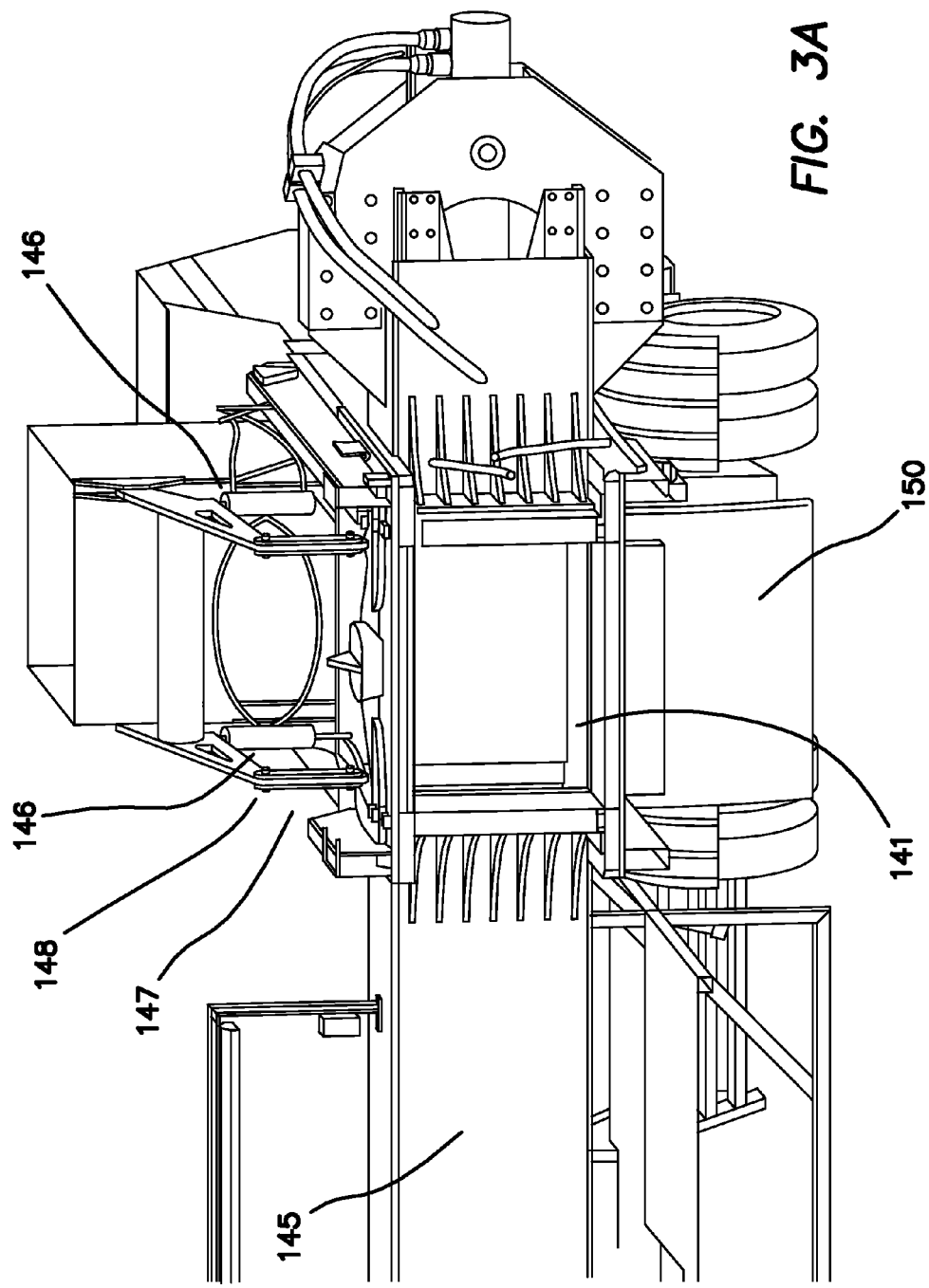

MOBILE HAY PRESS AND METHOD OF USING THE SAME

FIELD OF THE INVENTION

The embodiments of the present invention relate to a mobile hay press configured to compress conventionally baled hay into smaller packages for shipping.

BACKGROUND

Hay is conventionally baled using a large vehicle known as a hay baler. In general, the hay baler uses a device known as a pickup to harvest the hay. The pickup comprises a series of metal bands on a spool that rotates as it passes over the hay along with the hay baler moving over a field of hay. After the hay is harvested by the pickup, the hay is transported to a connected baler that presses the hay into a bale and cuts the bale to size. The hay may be compressed by a spring mechanism and packing arm that moves back and forth as hay is collected inside of a bale chamber. When a complete bale is made, the baler ties the bale with twine and ejects them to the field. Square bales are built in many different sizes. In one embodiment, the apparatus disclosed herein accommodates, without additional pre-processing, and in an un-ground or un-chopped state, bales of 3'×4' cross section with lengths of 6' to 9' and also 4'×4' cross section with lengths of 6' to 9'. As described, the aforementioned bales weigh between 700 and 2500 pounds. The apparatus can also accommodate any size or shape bale that is first ground or chopped into a loose state and then repressed by the apparatus by first loading the ground or chopped hay into a loose hay loading chamber also incorporated into the apparatus.

With increased hay exports, it would be advantageous to develop an apparatus for compressing conventional hay bales making them more suitable for shipment. Ideally, the apparatus would be mobile allowing it to be transported to the source of the hay bales.

SUMMARY

Accordingly, a first embodiment of the present invention comprises an apparatus (termed a "hay press") configured to generally (i) receive hay bales; (ii) cut the twine holding the hale bales together; (iii) move, by weight, a pre-established amount of loose hay into a compression chamber; (iv) compress the pre-established amount of loose hay into a package of pre-established size; and (v) eject and wrap the compressed package of hay for shipping. In one embodiment, the original hay bale having a 3'×4' or 4'×4' cross section is compressed into a 35" high by 49" long package of hay varying in width from 40" to 44".

In one embodiment, the hay press comprises a (i) loading table and destacker; (ii) twine slicer; (iii) loading compartment; (iv) loading hydraulic press and platen; (v) in-feed forks; (vi) compression chamber; (vii) scale; (viii) compression chamber door; (ix) hydraulic compression ram and platen; (x) hydraulic ejection press and platen; and (xi) ejection chute. Other elements and features may be present as described in detail below.

In one embodiment, the hay press is supported by a frame on wheels such that the hay press is mobile allowing it to be transported to sources of hay bales. A hitch member integrated with the frame allows the frame to be connected to a truck or similar vehicle which can then tow the hay press to any desired location. The unique in-line configuration of the hay press allows the hay press to be transported in one piece.

Other variations, embodiments and features of the present invention will become evident from the following detailed description, drawings and claims.

BRIEF DESCRIPTION OF THE DRAWINGS

FIGS. 3A-3B illustrate cross-sectional views of the hay press showing a compression chamber door in an opened and closed position, respectively, according to the embodiments of the present invention;

DETAILED DESCRIPTION

Figure 1A:
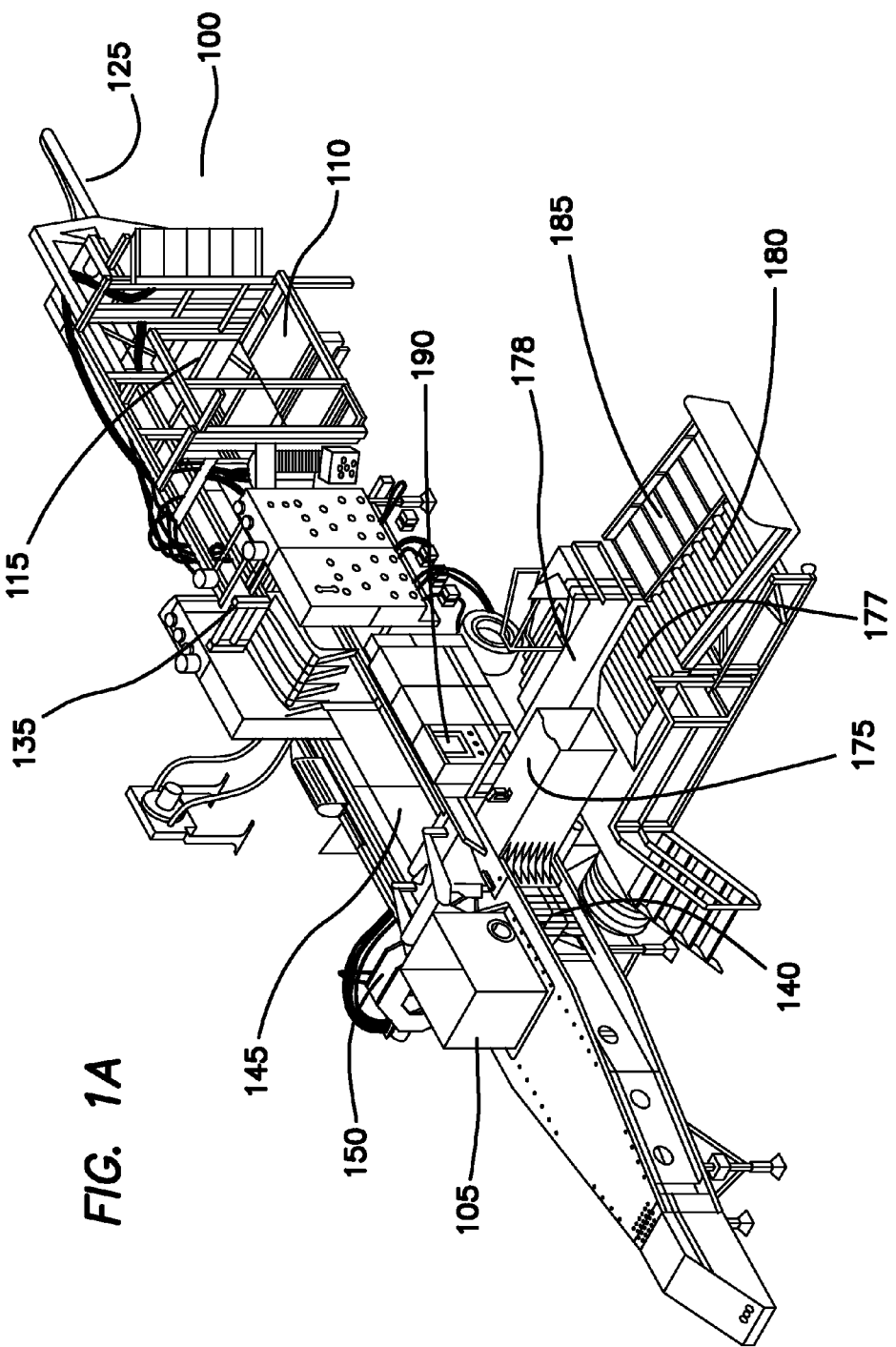
FIG. 1A illustrates a perspective, upper view of a hay press according to the embodiments of the present invention.

For the purposes of promoting an understanding of the principles in accordance with the embodiments of the present invention, reference will now be made to the embodiments illustrated in the drawings and specific language will be used to describe the same. It will nevertheless be understood that no limitation of the scope of the invention is thereby intended. Any alterations and further modifications of the inventive feature illustrated herein, and any additional applications of the principles of the invention as illustrated herein, which would normally occur to one skilled in the relevant art and having possession of this disclosure, are to be considered within the scope of the invention claimed.

The embodiments of the present invention are directed to a hay press which may be fabricated of known materials such as metals, alloys, composites and fasteners such as screws, rivets and welds. Those skilled in the art will recognize that any suitable materials and fasteners may be used to fabricate the hay press detailed below.

Figure 1B:
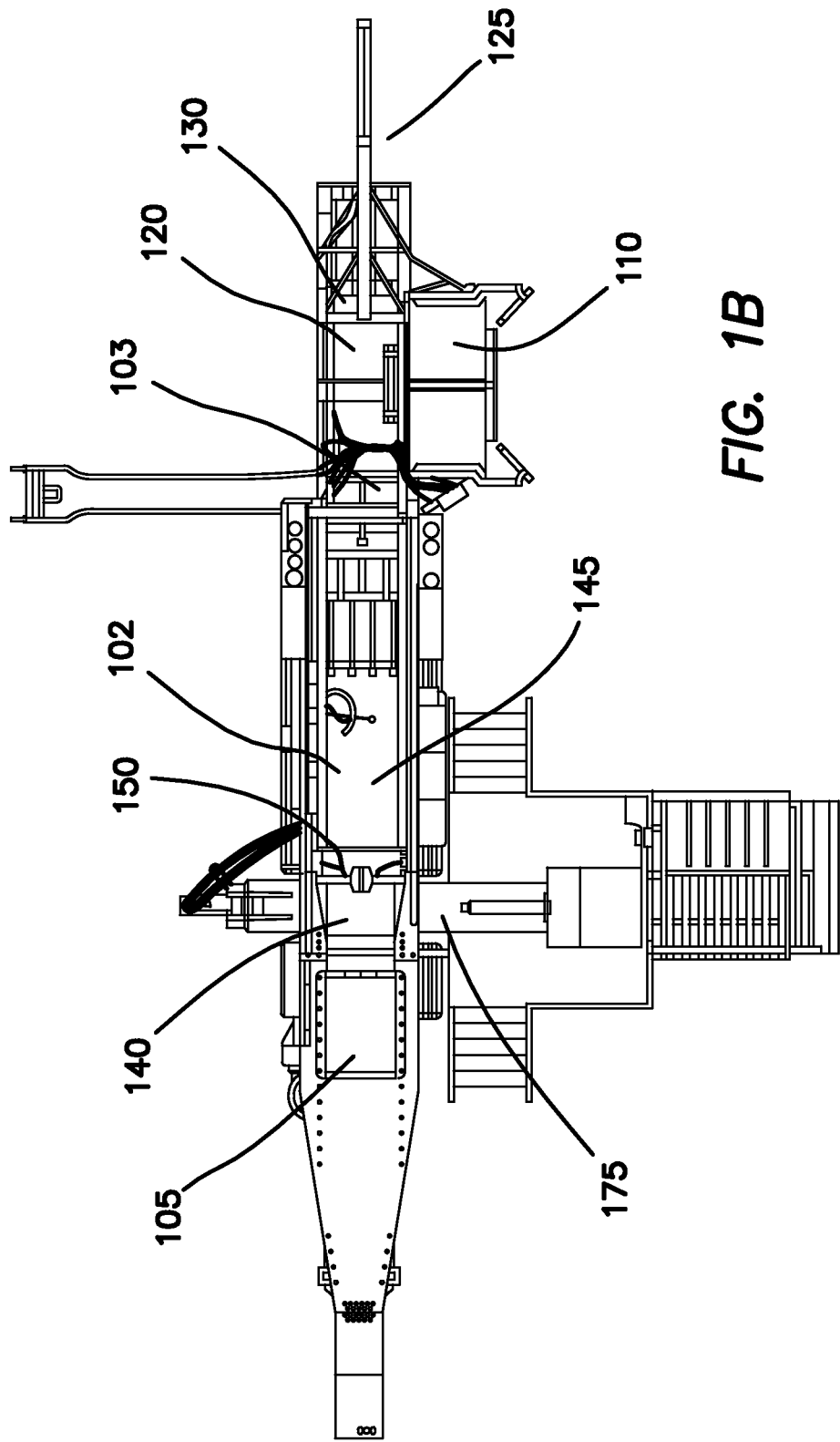
FIGS. 1B-1C illustrate side and top views of a hay press according to the embodiments of the present invention.
Figure 1C:
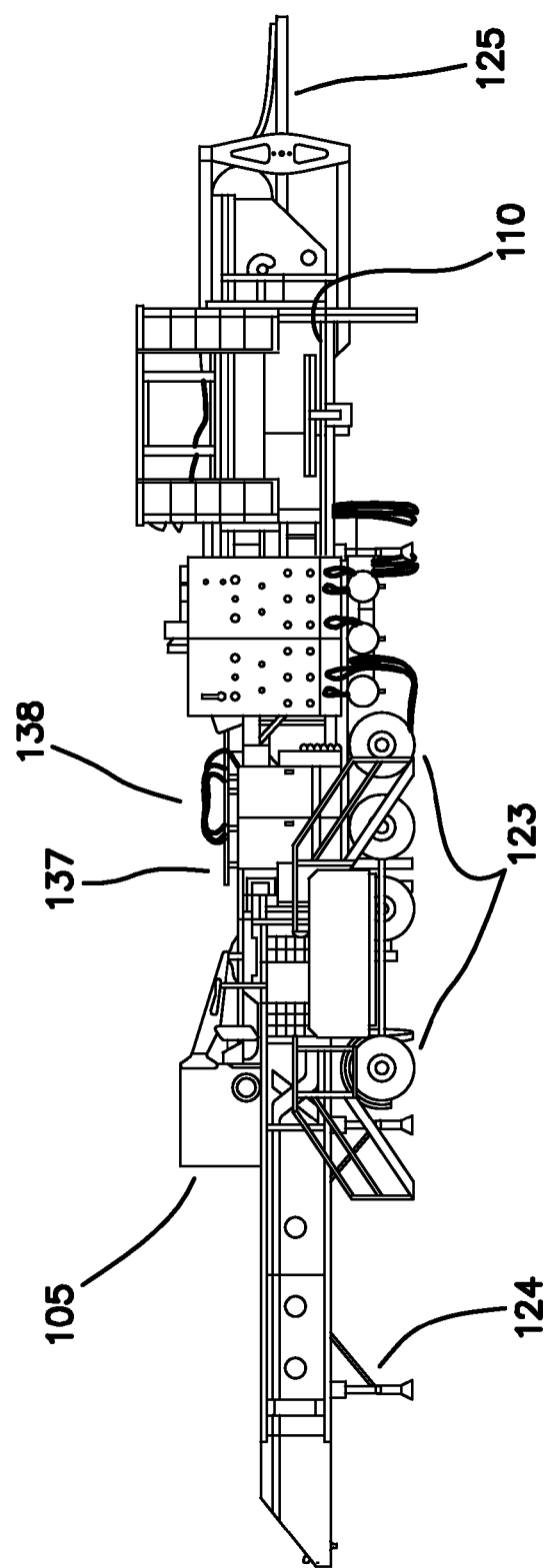

FIGS. 1A-1C show perspective upper, top and side views, respectively, of hay press 100 according to the embodiments of the present invention. The hay press 100 comprises a (i) loading table and destacker 110; (ii) twine slicer 115; (iii) loading compartment 120; (iv) loading hydraulic press 125 and platen 130; (v) infeed forks 135; (vi) compression chamber 140; (vii) scale 145; (viii) compression chamber door 150; (ix) hydraulic compression ram 155 and platen 160; (x) hydraulic ejection press 165 and platen 170; and (xi) ejection chute 175. Presses and rams described herein are described as hydraulically driven by multiple hydraulic pumps but those skilled in the art will understand that other systems may drive one or more of the presses and rams. Regenerative hydraulic circuits may be employed to reduce a number of required hydraulic pumps. Wheels 123 provide mobility for the hay press 100 and the trailer 124 supporting the same.

Figure 2I:
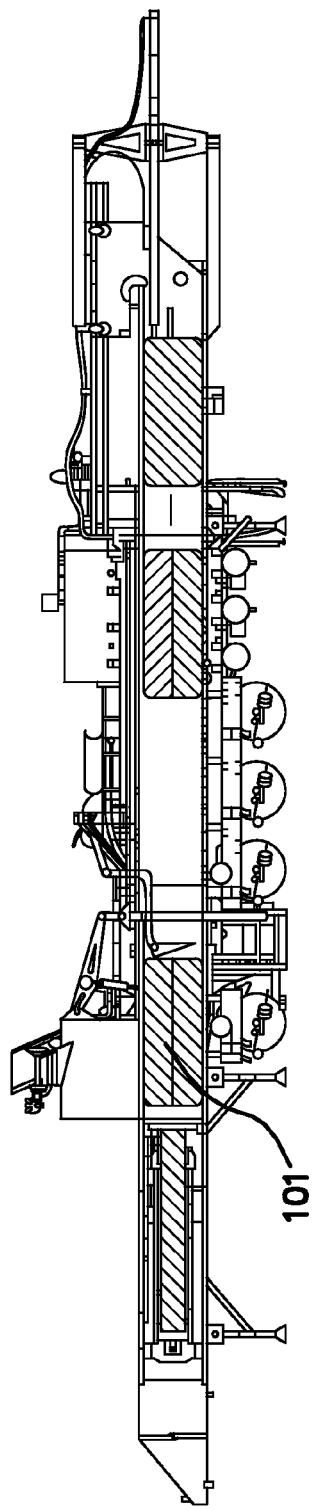
FIGS. 2A-2P illustrate corresponding side and top views of the hay press as the hay press operates according to the embodiments of the present invention.
Figure 2J:
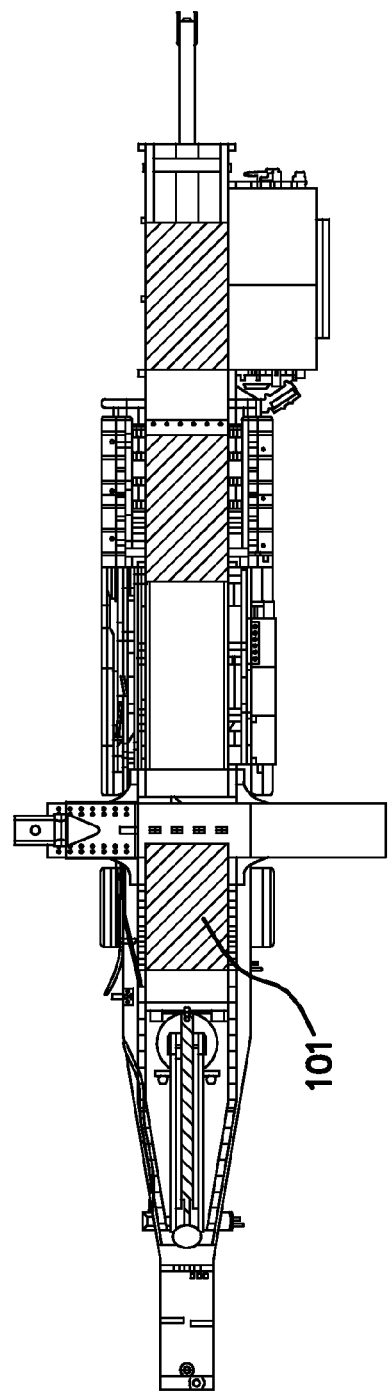
Figure 2K:
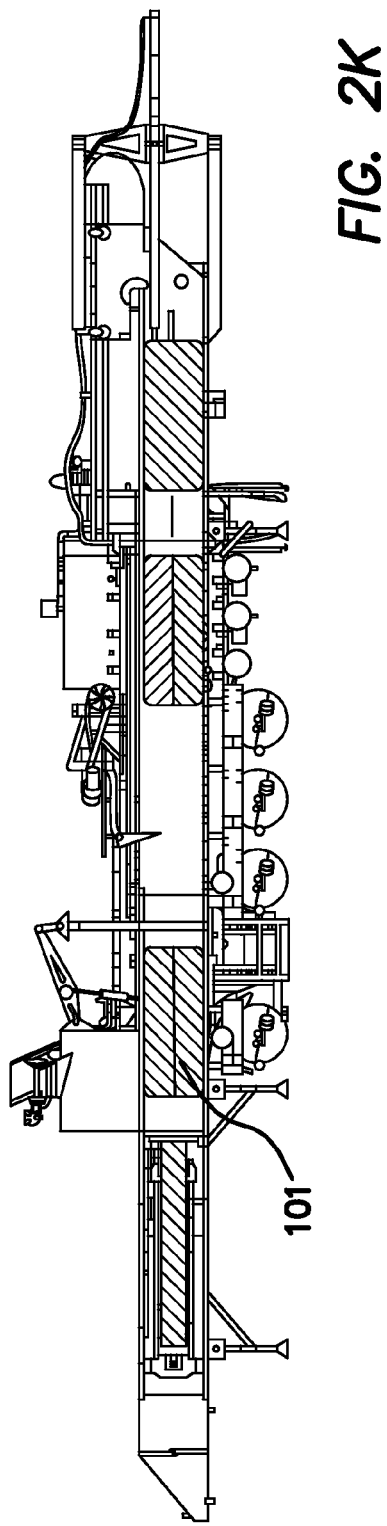
Figure 2L:
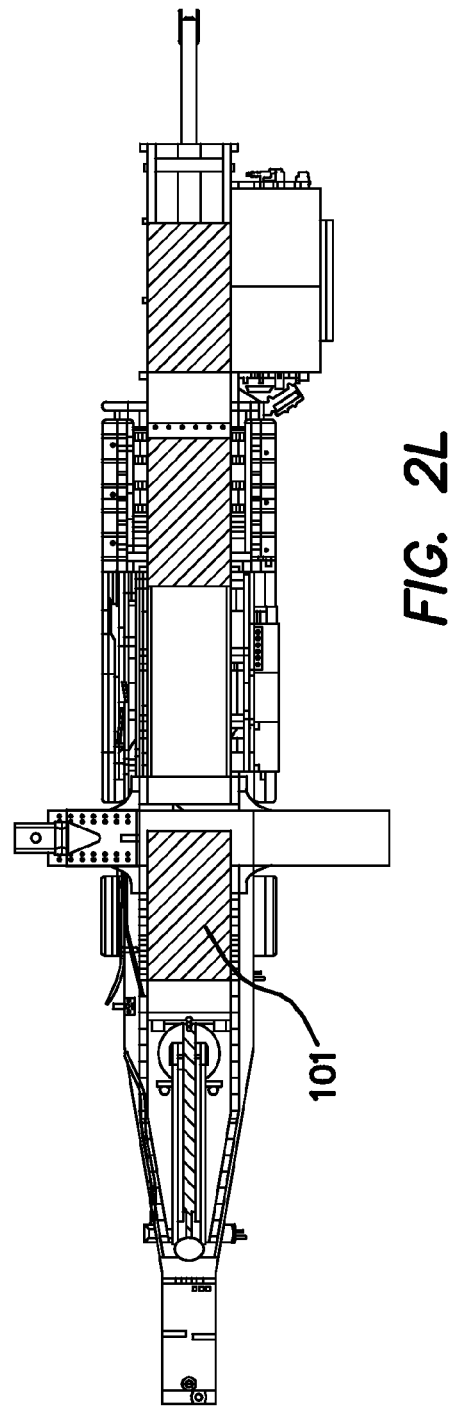
Figure 2M:
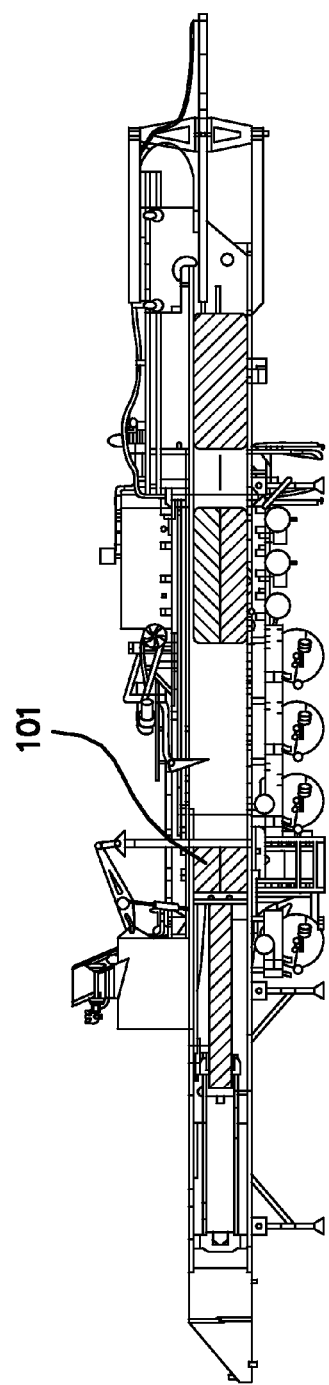
Figure 2N:
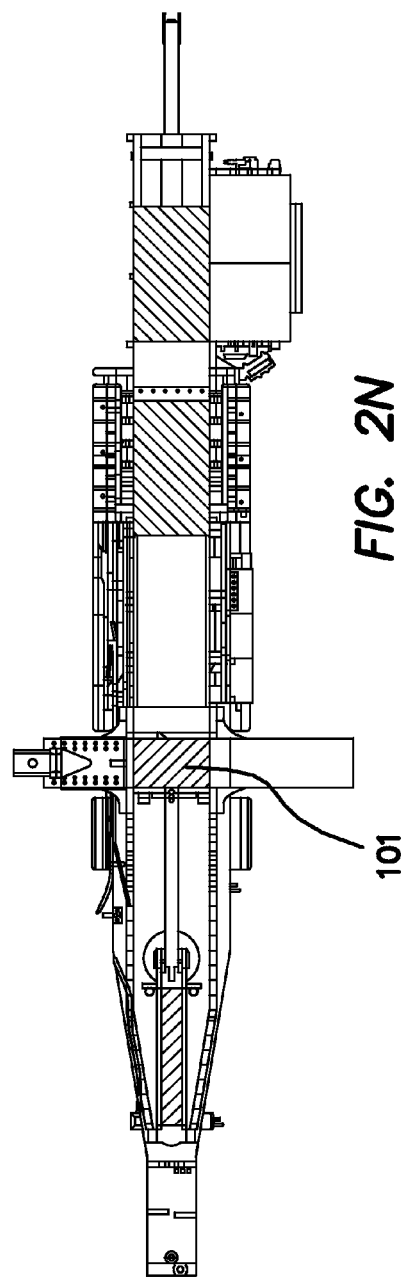
Figure 2O:
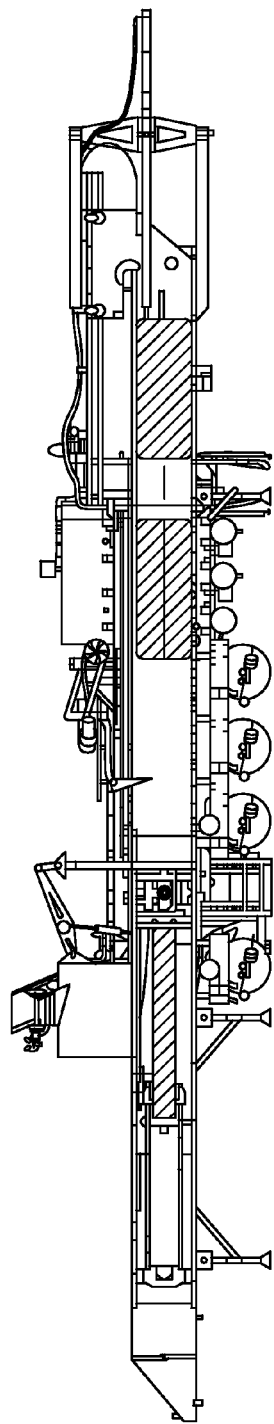
Figure 2P:
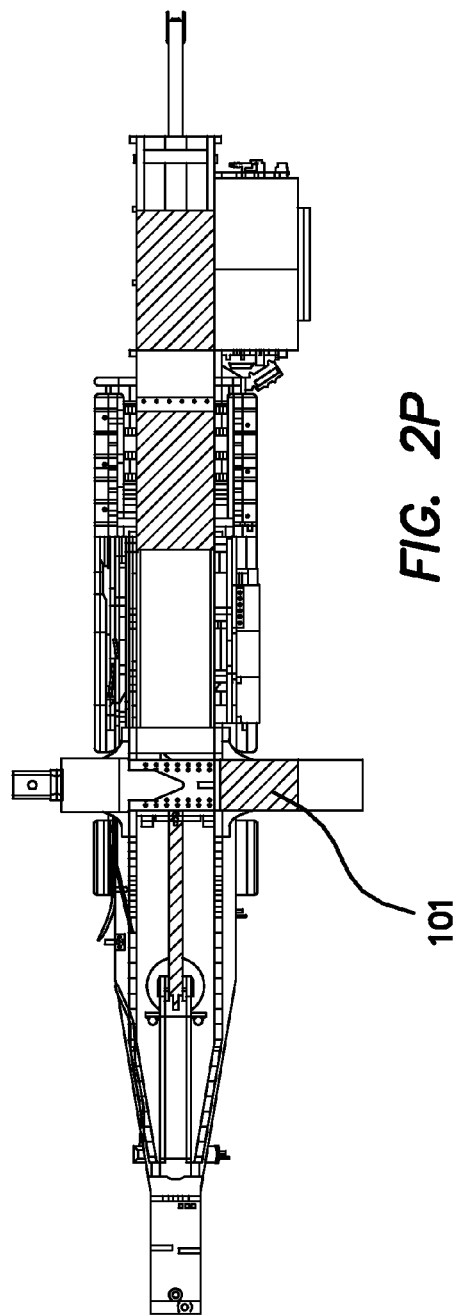

FIGS. 2A-2P show corresponding side and top views of the hay press 100 as the hay press operates. As shown in FIGS. 2A and 2B, a conventional hay bale 101 measuring 3'×4' in cross section and between 6' and 9' long is loaded into the hay press 100 from the integral destacker 110. The destacker 110 includes a loading table which is elevated from ground level and on which a stack of bales is placed by a forklift or some other apparatus. The stack of bales is lifted from the bottom hay bale in the stack so that the bottom hay bale 101 may be forced into the elevated loading compartment 120 by an automated push bar 111. Much of the hay press machinery is elevated since the hay press 100 is supported by a wheeled trailer for easy mobility. A twine slicer 115 in or adjacent to the loading compartment 120 slices the twine holding the hay bale 101 together. The twine slicer 115 may accomplish the task as the hay bale 101 is loaded into the loading compartment 120 and/or, as shown, when the hay bale 101 begins to exit the loading compartment 120 as described more fully below. The twine slicer 115 may be a static mechanism projecting into the path of the hay bale or a dynamic mechanism which ejects from a safe, stowed position when needed and returns to the safe, stowed position when not needed. Depending on the embodiment, the cut twine may need to be manually removed from the hay press 100. Alternatively, the hay press 100 includes a mechanism for removing the cut twine from the hay press 100.

Once the hay bale 101 is loaded into the loading chamber 120, as shown in FIG. 2C through and 2F, the loading hydraulic press 125 and platen 130 begin forcing the hay bale 101 through slicer knife 115 and into hay press passageway 102 and onto scale 145, wherein passageway 102 and scale 145 extend from said loading compartment 120 to said compression chamber 140. Slicer knife 115 may be optionally removed so that hay bale 101 is not sliced in half. When a pre-set amount of hay (by weight) is on scale 145, the hydraulic press 125 and platen 130 stop forcing the hay bale 101 into said passageway 102. The entrance to the hay press passageway 102 is sized to receive a 3'×4' cross section hay bale such that if an oversized bale (e.g., 4'×4' cross section hay bale) is forced into the hay press passageway 102, the hay bale is reduced in size as outer walls defining the hay press passageway 102 and a shear knife 103 shear off extra hay which is transferred by conveyor or chute (not shown) to loose hay loading chamber 105. The loose hay is then dropped into the compression chamber 140 after a most recent bale is pressed and forced out. The loose hay thus is added to a next bale in the series. When the slicer knife 115 is not removed from the apparatus 100, the hay bale 101 is sliced in half horizontally or vertically depending on the orientation of the slicer knife 115. Consequently, when a final compressed hay package is opened (i.e., wrap removed), the compressed hay tends to separate naturally and easily into smaller pieces rather than remaining in the same size as the compressed state and requiring manual efforts to separate the compressed hay.

As shown in FIGS. 2G and 2H, a set of in-feed forks 135 reach into the hay press passageway 102 from above and penetrate the hay bale and force a separated section of hay through the compression chamber door 150 and into the compression chamber 140. In other words, the hay bale 101 is not intended to reach the compression chamber 140 intact. The in-feed forks 135 are lowered from an inactive position to an active position by means of a hydraulic ram 136 which forces the infeed forks 135 into the hay press passageway 102 and hay bale 101. A motor (not shown) drives the infeed forks 135 along a track 137 which supports a tread arrangement 138 (best shown in FIG. 3C). A scale 145 positioned in the hay press passageway 102 between the loading compartment 120 and compression chamber 140 weighs hay entering the hay press passageway 102. As shown in FIGS. 2I and 2J, once the scale determines an adjustable, pre-established amount of hay (e.g., 1250 pounds) has been forced into the hay press passageway 102, the infeed forks 135 lower and section off, at a rear edge of the scale, the weighed hay, and force the weighed hay through the open compression chamber door 150 and into the compression chamber 140. The infeed forks 135 then retreat, as shown in FIGS. 2K and 2L, to force the next amount of weighed hay forward. Once the infeed forks 135 retreat from within the compression chamber 140, as determined by one or more sensors, the compression chamber door 150 is automatically closed.

Figure 3B:
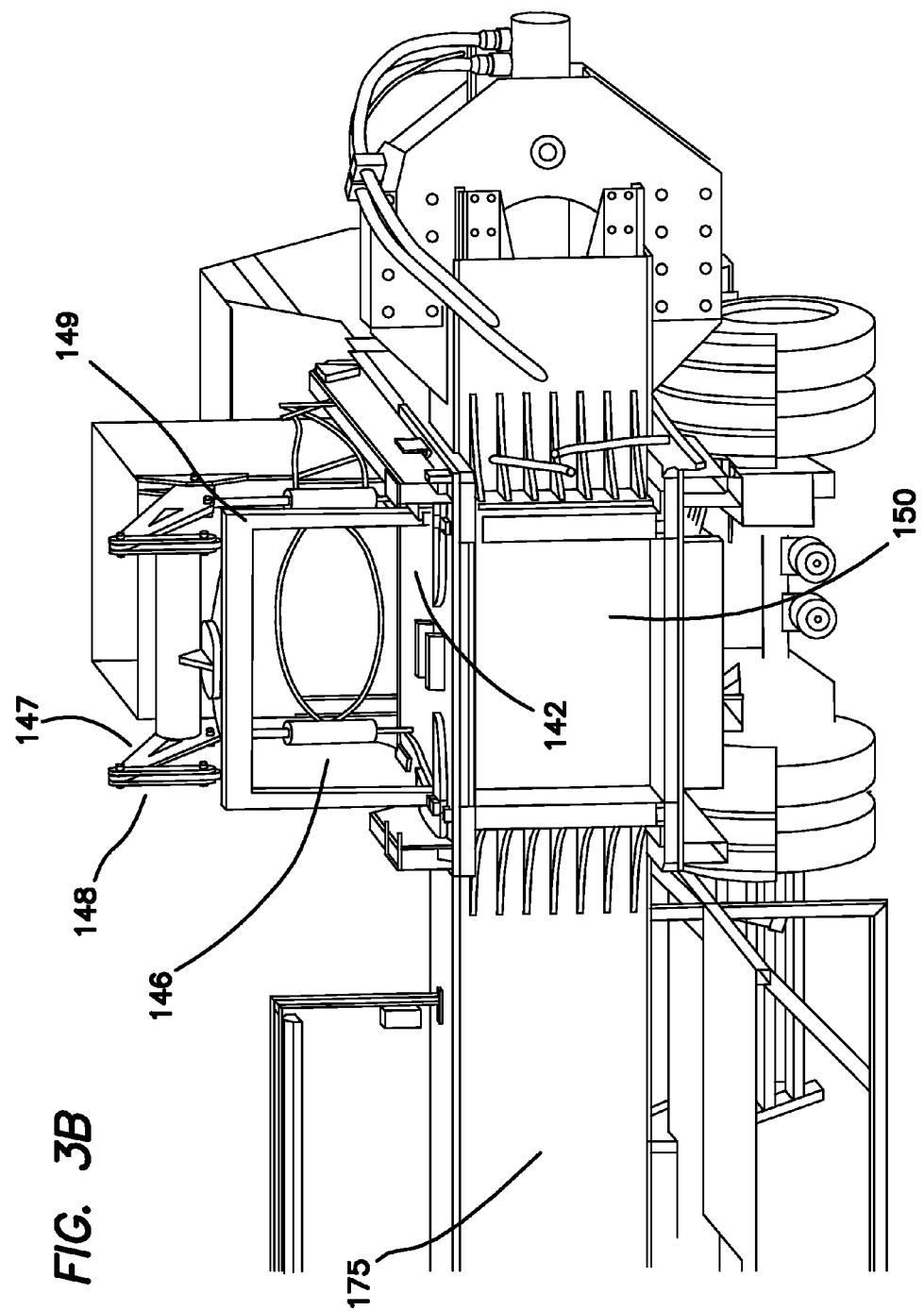
Figure 3C:
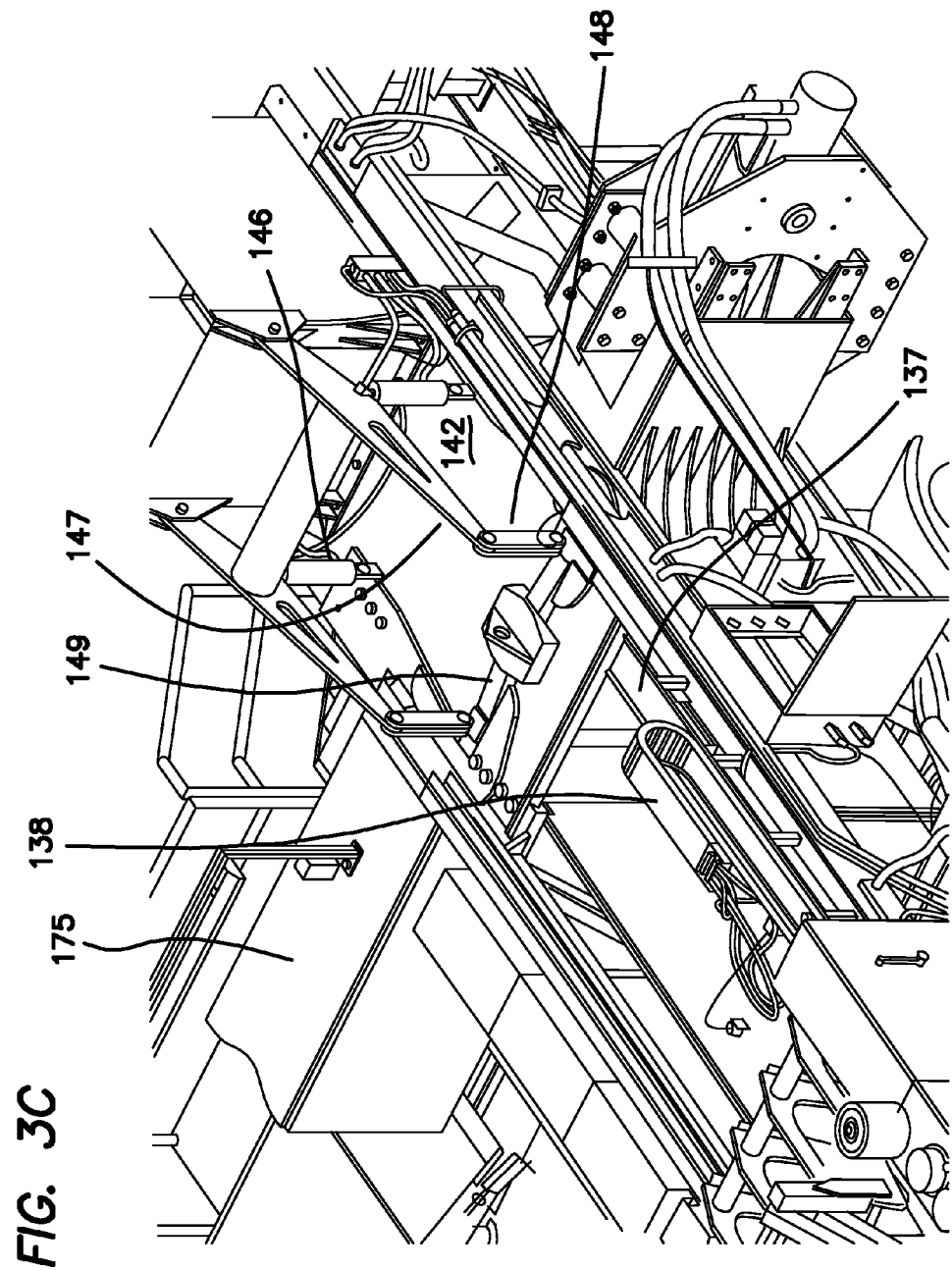
FIG. 3C illustrates an upper view of the hay press near the compression chamber door according to the embodiments of the present invention.

Opening and closing the compression chamber door 150 is accomplished using one or more hydraulic rams 146 to drive upward one or more arms 147 and linkage 148 connected to a door lift 149. FIG. 3A shows a cross-sectional view of the hay press showing the compression chamber door 150 in an opened position and FIG. 3B shows a cross-sectional view of the compression chamber door 150 in a closed position. As shown, when lifted, the compression chamber door 150 is closed and when lowered, the compression chamber door 150 is open. FIG. 3C shows an upper view of the hay press 100 with the compression chamber door 150 in a closed position. While the compression chamber door 150 is shown to move up and down it is also conceivable that the compression chamber door 150 may also be configured to move from side-to-side.

The compression chamber 140 is defined in part by a bottom 141, top 142 and the compression chamber door 150. The platen 170 of the hydraulic ejection press 165 and the platen 160 of the hydraulic compression ram 155 serve as two more sides of the compression chamber 140. A fourth and final side 143 of the compression chamber 140 includes in part a previously compressed hay package restrained in the ejection chute 175 by friction between the package and the ejection chute walls and extending from said compression chamber 140.

FIGS. 2M and 2N show the hydraulic compression ram 155 and platen 160 compressing the hay bale 101 within the compression chamber 140. FIGS. 2O and 2P show the compressed hay 101 being ejected from the compression chamber 140 via the ejection chute 175 by the hydraulic ejection press 165 and platen 170. The compressed hay is several times denser than the hay which was loaded into the compression chamber 140. Upon exiting the ejection chute 175, the compressed hay is wrapped in a band or sleeve of material (e.g., polyurethane, burlap, etc.) or banded with plastic or steel bands to maintain the hay in the compressed state. The sleeve or bands are positioned over an end of the ejection chute 178 such that the section of compressed hay is encased into the sleeve or bands. The ejection chute 175 is long enough to contain two units of compressed hay such that the two units of compressed hay act to form one side of the compression chamber 140.

After the compressed hay is ejected and packaged, a second scale 177 weighs the compressed hay package. The compressed hay package is hand labeled, bar-coded or RF tagged to allow each compressed hay package to be tracked. The compressed hay package is then transported by rollers 180 or conveyor belts onto a stacking table 185 that indexes and stacks the compressed hay package to form a 2×2 compressed hay package arrangement which may be picked up and loaded by a forklift or similar device into a shipping container. In another embodiment, the stacking table 185 is controlled by hydraulics or similar technology allowing the stacking table 185 to directly load the compressed hay packages into a shipping container.

A control panel 190 allows a single operator to control the hay press 100. The control panel 190 utilizes touch screen technology along with other user interface means and relies on proprietary software to facilitate the desired hay press actions according to the instructions input by an operator.

In another embodiment, a conveyor system 191 handles loose hay thereby limiting clean-up and general labor related to the operation of the hay press 100. FIGS. 2A, 2C and 2E show the conveyor system 191 in proximity to the hay press 100. A first conveyor unit 191 runs either substantially parallel to a backside of the hay press 100 and/or beneath the hay press 100 proximate the compression chamber 140 such that any hay falling from the hay press 100 during operation lands on a conveyor belt of the first conveyor unit 191 which, when running, moves the captured hay to a second conveyor unit 193 extending from one end of the first conveyor unit 191 upward to the loose hay loading chamber 105 which leads into the compression chamber 140 such that the loose hay may be automatically handled without significant manual labor. From the loose hay loading chamber 105, the loose hay may be moved into the path of the press ram 155 and forced by the press ram 155 into the compression chamber 140 to become part of a compressed hay bale.

Figure 4:
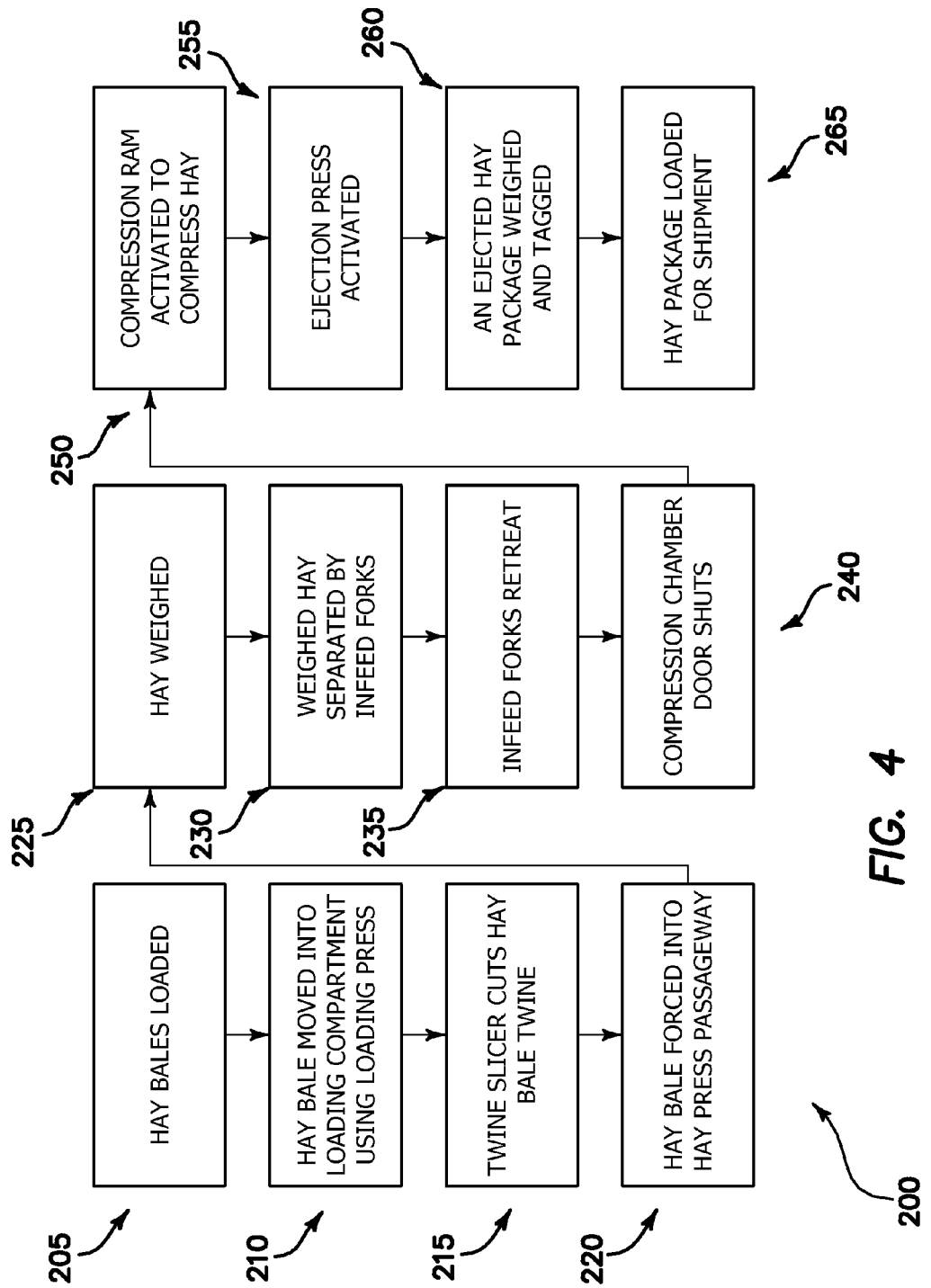
FIG. 4 illustrates a flow chart detailing operation of the hay press according to the embodiments of the present invention.

FIG. 4 shows a flow chart 200 detailing one methodology for operating the hay press 100 according to the embodiments of the present invention. At 205, one or more traditional hay bales are loaded onto the loading table and destacker 110. At 210, the destacker 110, utilizing the push bar 111, moves a top most hay bale into the loading compartment 120. At 215, twine slicer 115 cuts the twine holding the loaded hay bale together. The twine slicer 115 may be positioned to cut the twine when the hay bales are loaded into the loading compartment 120 or when the hay bales begin to be forced into the hay press passageway 102. At 220, the loading hydraulic press 125 and platen 130 begin forcing the loaded hay bale into hay press passageway 102. At 225, a scale in the hay press passageway 102 weighs the hay being forced into the hay press passageway 102. Those skilled in the art will recognize that the scale may be positioned anywhere along the hay press passageway 102 or even within the compression chamber 140. At 230, responsive to a scale output indicating a pre-established amount of hay is in the hay press passageway 102 (or compression chamber 140), infeed forks 135 separates the weighed hay and forces the hay section into the compression chamber 140. At 235, the infeed forks 135 retreat from the compression chamber 140. At 240, responsive to a sensor output indicating that the infeed forks 135 have retreated from the compression chamber 140, the compression chamber door 150 is closed. At 250, the hydraulic compression ram 155 and platen 160 are activated to compress the hay in the compression chamber 140. After the compression is complete, at 255, the hydraulic ejection press 165 and platen 170 activate to force the compressed hay into the ejection chute 175. Assuming there are already two compressed hay units in the ejection chute 175, the new compressed hay unit forces one compressed hay unit from the ejection chute 175 causing the ejected compressed hay unit to be packaged. At 260, the ejected, packaged hay is weighed and bar-coded or otherwise tagged. At 265, the hay package is loaded into a shipping container.

The embodiments of the present invention involve multiple advantages including mobility allowing the hay press 100 to be transported to the hay source rather than transporting hay to the hay press. The mobility eliminates the need for specialty facilities for receiving hay prior to access to the hay press and thereafter. The mobile hay press is ideal for small hay producers and shippers incapable or not desirous of owning a large, expensive hay press. The mobile hay press is also subject to less governmental oversights and regulations, at least for the hay producers and shippers. Another advantage is the narrow width facilitated by the inline configuration allowing the hay press to be transported on highways without significant re-configuration. Yet another advantage is the use of the compression chamber door 150 as a back wall for the compression chamber 140. Moreover, the door 150 design facilitates the inline design and allows the hay to be loaded opposite the hydraulic compression ram 155. By loading the hay opposite the hydraulic compression ram 155 and platen 160, the stroke of the hydraulic compression ram 155 and platen 160 is reduced thus decreasing the time necessary to compress loaded hay and required horsepower. That is, hay may be loaded into the compression chamber 140 as the hydraulic compression ram 155 and platen 160 are retracting from the last compression.

While not shown, the hay press 100 described herein may include numerous additional sensors to maintain a status of the hay press process such that the hay press may be stopped or otherwise manipulated if problems arise. Moreover, various tubing and piping configured to carry various fluids (e.g., hydraulic, water, etc.) form part of the hay press 100 and facilitate the process undertaken by the hay press 100.

The embodiments of the present invention may be embodied in other specific forms without departing from the spirit or essential characteristics thereof. The present embodiments are therefore to be considered in all respects as illustrative and not restrictive.

I claim:

1. A hay press comprising:
   a loading compartment;
   a loading press and platen positioned to force hay loaded in said loading compartment into a passageway leading from said loading compartment to a compression chamber;
   infeed forks configured to force hay in said passageway into said compression chamber;
   a scale positioned in said passageway for weighing hay being forced into said compression chamber;
   a compression chamber door which when open allows said infeed forks to force hay from said passageway into said compression chamber and when closed acts as a wall of said compression chamber;
   a compression press and platen for compressing said hay in said compression chamber against said compression door; and
   an ejection press and platen for ejecting compressed hay from said compression chamber into an ejection chute.

2. The hay press of claim 1 further comprising said ejection chute extending perpendicular to said passageway.

3. The hay press of claim 1 further comprising a scale for weighing hay being ejected from said ejection chute.

4. The hay press of claim 1 further comprising a trailer and wheels.

5. The hay press of claim 1 further comprising a destacker configured to load hay bales into said loading compartment.

6. The hay press of claim 1 wherein said compression chamber door moves up and down.

7. A hay press comprising:
   a loading compartment;
   a loading press and platen positioned to force hay loaded in said loading compartment into a passageway leading from said loading compartment to a compression chamber;
   infeed forks configured to force hay in said passageway into said compression chamber;
   a scale positioned in said passageway for weighing hay being forced into said compression chamber;
   a compression chamber door configured to close responsive to an output of said scale indicating a minimum amount of hay by weight in said compression chamber;
   a compression press and platen for compressing said hay in said compression chamber against said compression door, said compression press and platen moving in opposite direction as said loading press and platen; and an ejection press and platen for ejecting compressed hay from said compression chamber into an ejection chute.

8. The hay press of claim 7 further comprising said ejection chute extending perpendicular to said passageway.

9. The hay press of claim 7 further comprising a scale for weighing hay being ejected from said ejection chute.

10. The hay press of claim 7 further comprising a trailer and wheels.

11. The hay press of claim 7 further comprising a destacker configured to load hay bales into said loading compartment.

12. The hay press of claim 7 wherein said compression chamber door moves up and down.

13. A hay press comprising:
- a destacker configured for receipt of one or more hay bales, said destacker further configured to move said one or more hay bales into a loading compartment;
- a loading press and platen positioned to force hay loaded in said loading compartment into a passageway leading from said loading compartment to a compression chamber;
- a scale positioned in said passageway for weighing hay;
- infeed forks configured to force hay in said passageway into said compression chamber;
- a compression chamber door which when open allows said infeed forks to force hay from said passageway into said compression chamber and when closed acts as a wall of said compression chamber;
- a compression press and platen for compressing said hay in said compression chamber against said compression door; and
- an ejection press and platen for ejecting compressed hay from said compression chamber into an ejection chute, said ejection chute configured to hold one or more compressed hay units, said one or more hay units acting as at least a portion of a compression chamber wall.

14. A method comprising:
- forcing hay loaded in said loading compartment into a passageway leading from said loading compartment to a compression chamber;
- weighing an amount of hay in said passageway;
- forcing the weighed amount of hay in said passageway into said compression chamber by infeed forks;
- closing a compression chamber door which when open allows hay from said passageway into said compression chamber and when closed acts as a wall of said compression chamber;
- compressing said hay in said compression chamber against said compression door; and
- ejecting compressed hay from said compression chamber into an ejection chute.

15. The method of claim 14 further comprising utilizing a conveyor system to capture and transport loose hay to a loose hay loading chamber in communication with said compression chamber.

16. A hay press comprising:
- a loading compartment;
- a loading press and platen positioned to force hay loaded in said loading compartment into a passageway leading from said loading compartment to a compression chamber;
- infeed forks configured to force hay in said passageway into said compression chamber;
- a scale positioned in said passageway for weighing hay being forced into said compression chamber;
- a compression press and platen for compressing said hay in said compression chamber;
- an ejection press and platen for ejecting compressed hay from said compression chamber into an ejection chute; and
- a conveyor system for capturing and transporting loose hay which has fallen during operation to a loose hay loading chamber in communication with said compression chamber.

17. The hay press of claim 16 wherein said conveyor system comprises a first conveyor unit running proximate to the compression chamber and leading to a second conveyor unit extending from one end of the first conveyor unit upward to the loose hay loading chamber.

* * * * *